Figure 2:
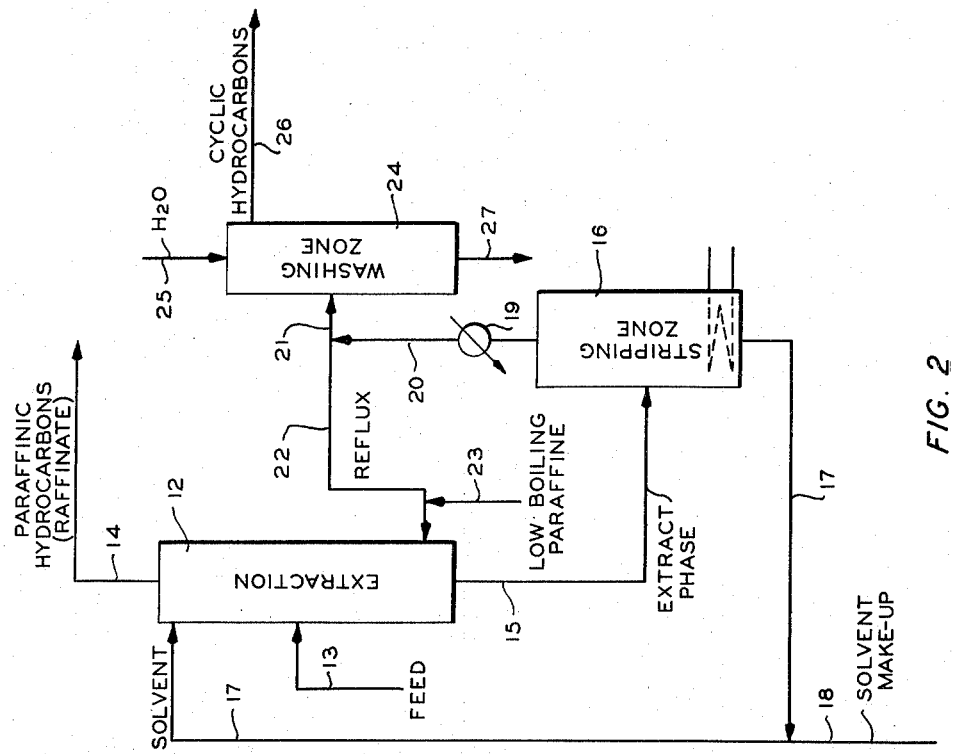

Oct. 9, 1956

J. A. WEEDMAN 2,766,300

SOLVENT EXTRACTION PROCESS

Filed Aug. 17, 1953

2 Sheets-Sheet 1

INVENTOR.
J. A. WEEDMAN

BY

Hudson and Young

ATTORNEYS

United States Patent Office 2,766,300
Patented Oct. 9, 1956

2,766,300

SOLVENT EXTRACTION PROCESS

John A. Weedman, Bartlesville, Okla., assignor to Phillips Petroleum Company, a corporation of Delaware Application August 17, 1953, Serial No. 374,727

19 Claims. (Cl. 260—666)

This invention relates to the purification of hydrocarbons. In one aspect it relates to the separation of hydrocarbons of a given chemical structure from hydrocarbons having a different chemical structure. In another aspect it relates to the separation of paraffinic from non-paraffinic hydrocarbons. In another aspect it relates to the purification of cyclic hydrocarbons. In still another aspect it relates to a process for the separation of hydrocarbon types by liquid-liquid extraction under isothermal conditions.

It has been general practice in the liquid-liquid extraction art to operate at relatively low temeratures such as in the range 50° to 200° F. This has been previously thought necessary because the critical solution temperature of most solvents used in the separation of hydrocarbon types is relatively low and also because the selectivities of solvents ordinarily decrease with an increase in temperature. When the extraction step is operated at temperatures below those necessary to strip the extract product from the solvent, it is necessary to heat the extract phase to a relatively high stripping temperature and to cool the heated and stripped solvent in order to recover an extract product and a solvent in condition for recycle. A successive heating and cooling of solvents in order to strip dissolved materials therefrom is undesirable because it is accompanied by relatively low overall thermal efficiencies and because high localized or skin temperatures in stripping equipment have resulted in solvent decomposition and coking of heating coils.

According to this invention, there is provided a method for purifying organic materials, especially hydrocarbons, by liquid-liquid extraction at elevated temperatures under substantially isothermal conditions and stripping the solvent at isothermal conditions, whereby the solvent stripping is accomplished readily and without successive heating and cooling steps involving large volumes of extract phase. Thus, according to this invention, wherein the solvent extraction and stripping are conducted under isothermal conditions, it is necessary only to reduce the pressure on the separated extract phase and to supply only sufficient heat to prevent a substantial change in temperature, in order to strip dissolved materials from the extract or solvent phase. Thus, according to this invention, the extraction step and the solvent stripping step are conducted under substantially isothermal conditions at a temperature higher than the temperatures that have customarily been used in the prior art.

The process of this invention is applicable generally to the separation of hydrocarbons having different chemical or molecular structures. For example, according to this invention, paraffinic hydrocarbons can be separated from non-paraffinic hydrocarbons; paraffinic hydrocarbons can be separated from aromatic hydrocarbons; paraffinic hydrocarbons from cycloparaffinic hydrocarbons; cycloparaffinic hydrocarbons from aromatic hydrocarbons; and olefinic hydrocarbons from non-olefinic hydrocarbons. Since the process of the invention is capable of producing extract hydrocarbons of high purity, it is often desirable to isolate a desired extract product in a relatively concentrated fraction, e. g., by fractional distillation, prior to further purification by the process of this invention. Thus, concentrates of benzene, toluene, or xylenes containing small amounts of close-boiling and/or azeotrope-forming paraffinic and/or naphthenic hydrocarbons constitute one class of feed stocks, according to this invention. Concentrates of cyclopentane, of methylcyclopentane, of cyclohexane and of methylcyclohexane, containing close-boiling paraffinic hydrocarbons, represent another class of feed stocks suitable for use in this invention. Cyclopentane concentrates, benzene concentrates, xylene concentrates, and cyclohexane concentrates may be purified to a high degree of purity by the use of this invention. Thus, a commercially available cyclohexane concentrate comprising 85 weight percent cyclohexane, and as impurities, paraffins, especially 2,4-dimethylpentane, can be purified in accordance with this invention to obtain cyclohexane of 99 percent purity.

On account of the relatively high temperature at which the extraction, according to this invention, is conducted, the solvent used must have a high boiling point and a high thermal stability. Thus, it is preferred to use solvents which have boiling points above 450° F., and which are thermally stable at temperatures as high as 400° F. Suitable solvents are glycol ethers such as polyethylene glycols, polypropylene glycols, Carbitols, and Cellosolves. Specific examples of solvents utilizable in the process of this invention are triethylene glycol, tetraethylene glycol, dipropyleneglycol and the alkyl ethers of polyethylene glycol. Suitable alkyl ethers are the Carbitols, such as methyl, propyl, and butyl Carbitols, and the Cellosolves, such as methyl, ethyl, propyl, and butyl Cellosolves. Triethylene glycol is a highly satisfactory solvent in many instances. Also, a commercial product sold as polyethylene glycol and containing several individual polyethylene glycols is suitable.

The liquid-liquid extraction, according to this invention, is conducted at a temperature in the range 200° to 400° F. The specific temperature used depends upon the particular solvent and the particular feed stream treated and the optimum temperature can readily be determined by routine test in any given case. In the purification of cyclohexane containing 2,4-dimethylpentane as an impurity, a preferred temperature is in the range 350° to 400° F. When it is desired to purify a concentrate of cyclopentane or of low-boiling aromatic hydrocarbons such as benzene or xylenes, a temperature in the range 200° to 350° F. is often preferred.

The pressure of the extraction step is a pressure sufficient to maintain the hydrocarbon feed and the solvent substantially in the liquid phase. Thus, when a cyclohexane concentrate is used as the feed and triethyleneglycol is used as the solvent, a pressure in the range 140 to 180 pounds per square inch gauge is satisfactory. When it is desired to produce an alkylbenzene concentrate as an extract from a naphtha, a pressure in the range 50 to 150 p. s. i. a. is satisfactory.

The liquid-liquid contacting may be conducted by any of the methods known in the art. For example, single stage agitation in a stirrer-fitted container may be used. Also, countercurrent extraction in a packed tower or in a tower containing baffles or bubble plates or cascade type trays may be used.

Ordinarily the volume ratio of solvent to hydrocarbon feed is in the range 3 to 20, preferably 5 to 15, volumes of solvent per volume of hydrocarbon feed.

After liquid-liquid contacting of the solvent with the hydrocarbon feed in the extraction step, a raffinate phase is separated from an extract phase. The extract phase, still at the extraction temperature, is passed to a stripping zone. A stripping zone is maintained at a pressure lower than that maintained in the extraction step, and only sufficient heat is added to the extract phase to maintain said phase at substantially the temperature of the extraction step, i. e., only sufficient heat is added to prevent a substantial temperature change. Thus, the extraction and the stripping are conducted under substantially isothermal conditions. The reduction of pressure in the stripping zone causes the dissolved extract hydrocarbon to be flashed or vaporized from the extract phase, and the flashed or vaporized material is recovered as a product of the process. The stripped solvent, still substantially at the temperature of the extraction zone, is recycled to the extraction zone. Thus, no successive steps of heating and cooling are required to strip extract hydrocarbon from the extract phase, since the entire process of extraction and stripping are conducted at substantially isothermal conditions, the stripping being effected solely by pressure reduction.

The stripping is conducted at a pressure preferably not greater than about 65 p. s. i. a., and more desirably a pressure in the range 5 to 65 p. s. i. a. In many cases, the stripping is advantageously conducted at a subatmospheric pressure, e. g. in the range of 0.9 to 15 p. s. i. a. The pressure can be as low as 0.1 p. s. i. a. in some cases.

EXAMPLE I

Figure 1:
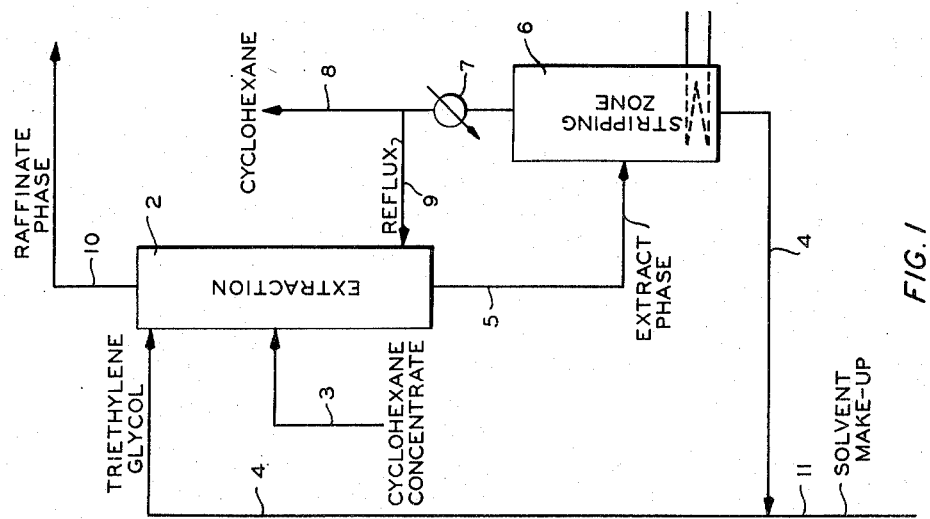

Figure 1 illustrates one embodiment of this invention wherein a cyclohexane concentrate containing from 85 to 90 percent cyclohexane, the remainder being principally isomeric heptanes, is purified by isothermal extraction with triethylene gylcol.

According to Figure 1, the cyclohexane concentrate enters extraction zone 2, through inlet 3. Extraction zone 2 is a 25 stage extractor provided with cascade type trays. Ten volumes of triethylene gylcol per volume of cyclohexane concentrate enters extraction zone 2 through conduit 4. This triethylene glycol stream is at a temperature of approximately 400° F. The cyclohexane concentrate and the triethylene glycol are countercurrently contacted in extraction zone 2, an extract phase being withdrawn through conduit 5 at a temperature of approximately 350° F. The extract phase is passed to stripping zone 6 wherein the pressure is reduced to approximately 5 p. s. i. a. In stripping zone 6, dissolved cyclohexane is flashed from the extract phase by virtue of the reduced pressure. Only sufficient heat is added in stripping zone 6 to maintain the temperature in the range 350° to 400° F. The flashed cyclohexane is condensed in condenser 7 and part thereof is removed as a product of the process through outlet 8. The remainder is recycled to a lower part of extraction zone 2 through conduit 9. The stripped solvent, preferably at a temperature of about 400° F., is recycled to extraction zone 2 through recycle conduit 4, any fresh triethylene glycol needed to make up for losses in the system being added through inlet 11. A raffinate comprising chiefly isomeric heptanes containing about 1 percent cyclohexane is recovered and withdrawn through outlet 10. The cycloparaffins withdrawn through outlet 8 have been concentrated to approximately 99 percent.

When methylcyclopentane is present in the feedstock, it too is concentrated in the extract phase. Fractionation of the extracted cycloparaffins removes the methylcyclopentane and produces cyclohexane having a purity of approximately 99.5 percent.

The following analyses will serve to describe examples of difficulty separable cyclohexane concentrates which cannot be further concentrated economically by fractionation, and to show the degree to which such concentrates can be readily separated by the process of this invention to produce a paraffinic concentrate and a cyclic concentrate from which pure cyclohexane can be produced by distillation.

Table I

SUPEREXTRACTION OF CYCLOHEXANE CONCENTRATES

| Component | Vol. percent in Feed | Vol. percent in Extract a | Vol. percent in Feed | Vol. percent in Extract b | Vol. percent in Purified c Composite |
|---|---|---|---|---|---|
| 2-Methylhexane | 2.2 | | 1.7 | | |
| 2,2-Dimethylpentane | 2.8 | 1.0 | 2.2 | | 0.1 |
| 3,3-Dimethylpentane | 0.9 | | | | |
| 2,4-Dimethylpentane | 6.6 | 0.1 | 5.3 | 0.1 | 0.3 |
| Cyclohexane | 83.0 | 98.5 | 86.3 | 97.9 | 99.5 |
| Methylcyclopentane | 0.9 | 1.4 | 1.6 | 1.1 | |
| 2,3-Dimethylpentane | 1.7 | 0.4 | 0.9 | 0.1 | |
| 1,1-Dimethylcyclopentane | 3.6 | 0.4 | 2.1 | 1.2 | 0.1 |
| Total | 101.7 | 101.8 | 100.1 | 100.4 | 100.0 | a Reflux ratio 2/1.
b Reflux ratio 5/1.
c The other columns represent typical examples of several runs. A composite was blended from these runs; the blend was water washed, acid washed with 98% sulfuric acid; and finally, fractionated to purify the cyclohexane. A benzene analysis revealed the presence of 0.004 percent benzene by volume.
ASTM Distillation (D-1078) showed an initial boiling point of 80.7 C. and a dry point of 81.0 C.

EXAMPLE II

Figure 2 illustrates another embodiment of this invention in which an aromatic hydrocarbon of high purity is obtained.

A benzene concentrate, such as described in Table II below, containing relatively large amounts of paraffinic impurities enters extraction zone 12 through line 13. Extraction zone 12 is an extraction vessel similar to that described in Example I. Triethylene glycol enters extraction zone 12 through recycle conduit 17 at a temperature in the range 200° to 350° F. The benzene concentrate and the triethylene glycol are countercurrently contacted in extraction zone 12 at a temperature in the range 200° to 350° F., a paraffinic raffinate phase being withdrawn through outlet 14. This raffinate phase contains small amounts of triethylene glycol, which can be removed by washing with water in means not shown in the drawing. Extract phase is withdrawn through conduit 15 and passed to stripping zone 16 which operates in a manner similar to that described for the stripping zone 6 in Example I, only sufficient heat being added in this stripping zone to maintain a temperature in the range 200° to 350° F. Stripped solvent is recycled to extraction zone 12 through recycle conduit 17, make-up solvent being added through inlet 18. Flashed aromatic hydrocarbons are taken overhead from stripping zone 16 and condensed in condenser 19, part being recycled through conduits 20 and 22 to a lower part of extraction zone 12. A low-boiling paraffinic hydrocarbon, such as normal pentane, is added to the reflux stream through inlet 23 to improve the selectivity of the solvent under the extraction conditions. The flashed aromatic hydrocarbons are passed through conduit 21 to washing zone 24 wherein any accompanying solvent is removed by the action of water which is introduced through conduit 25 and removed through conduit 27. The washed aromatics are withdrawn from the system through outlet 26 to fractionation means (not shown) for recovery of essentially pure benzene.

Table II

ANALYSIS OF 150–200° F. CUT FROM A PLATFORMED NAPHTHA

| ASTM Distillation | | Composition | Vol. percent |
|---|---|---|---|
| Vol. percent | Temp., °F. | | |
| IBP | 150 | | |
| 5% | 154 | Paraffins | 48.7 |
| 10% | 155 | Naphthenes | 12.1 |
| 30% | 157 | Aromatics | 39.2 |
| 50% | 159 | Benzene (Mol percent 47.5) | 1 37.7 |
| 70% | 162 | Toluene (Mol percent 1.1) | 1 1.2 |
| 90% | 169 | C₈ Aromatics (Mol percent 0.2) | 1 0.2 |
| 95% | 174 | C₉ Aromatics (Mol percent 0.1) | 1 0.1 |
| EP | 198 | | |

¹ Calculated from (Mol percent).

In a manner similar to that described in this example, xylenes concentrates can be produced. In such a case, however, it is desirable to conduct the extraction at a temperature in the range 350° to 400° F.

EXAMPLE III

Figure 3:
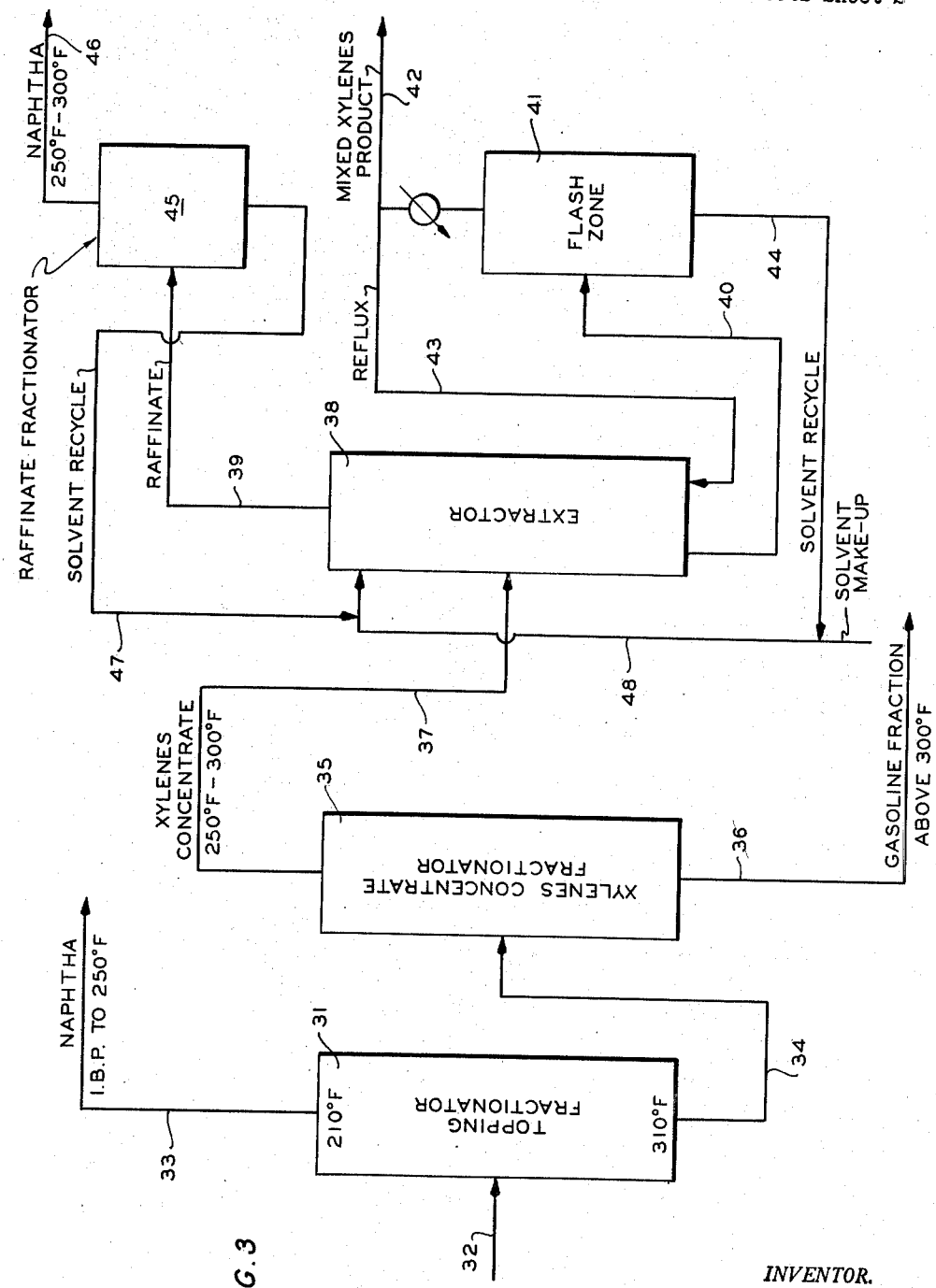

Figure 3 illustrates another embodiment of this invention in which a mixed xylene product is obtained from a straight run gasoline.

A straight run gasoline selected to contain appreciable amounts of C₈ aromatic hydrocarbons enters topping fractionator 31 through line 32 at the rate of approximately 27,000 bbl./day. Approximately 17,000 bbl./day of naphtha boiling below 250° F. is removed overhead through line 33 for use in blending gasolines and/or for further treatment to prepare special solvents, naphthas and other well known petroleum products. A bottoms product, approximately 10,000 bbl./day and boiling above 250° F., leaves fractionator 31 by way of line 34 and enters xylenes concentrate fractionator 35. Fractionator 35 produces approximately 6,550 bbl./day of overhead product having a boiling range of 250° to 300° F. through line 37. The xylenes concentrate enters extractor 38 from which a non-aromatic raffinate phase (approximately 6,000 bbl./day) leaves by way of line 39 and an aromatic extract phase (approximately 50,000 bbl./day) leaves by way of line 40. The extract phase enters flash zone 41 wherein the pressure is reduced and the temperature is maintained so that a mixed xylenes product (approximately 16,500 bbl./day) is removed overhead through line 42. Most (approximately 16,000 bbl./day) of the mixed xylenes product returns to the bottom of extractor 38 by way of line 43 to provide a final extract phase enriching step. Triethylene glycol solvent (approximately 33,000 bbl./day) removed from flash zone 41 recycles to the top of extractor 38 by way of line 44. The raffinate phase from line 39 enters raffinate fractionator 45 wherein a 250° to 300° F. low-aromatic-content naphtha (approximately 6,000 bbl./day) is separated from a small amount (approximately 60 bbl./day) of triethylene glycol solvent and leaves by way of line 46 for utility as a gasoline blending stock, solvent, special naphtha or other valuable products. The recovered triethylene glycol solvent from the bottom of fractionator 45 recycles to the top of extractor 38 by way of line 47. Additional triethylene glycol solvent (approximately 3 bbl./day) enters the system through line 48.

Table III summarizes the composition of the principal streams involved in Example III.

Table III

RECOVERY OF XYLENES CONCENTRATE FROM A STRAIGHT RUN GASOLINE

| Composition | Straight Run Gasoline, Bbls./day | Feed to Extractor, Bbls./day | C₈H₁₀ Alkylbenzene Concentrate, Bbls./day | Raffinate Naphtha, Bbls./day |
|---|---|---|---|---|
| Orthoxylene | 136 | 133 | 122 | 11 |
| Metaxylene | 296 | 296 | 272 | 24 |
| Para-xylene | 81 | 81 | 74 | 7 |
| Ethylbenzene | 81 | 80 | 74 | 6 |
| Other: | | | | |
| IBP–105° F | 2,740 | | | |
| 105–175° F | 5,750 | | | |
| 175–275° F | 5,200 | | | |
| 225–250° F | 3,290 | 486 | | 486 |
| 250–275° F | 3,010 | 2,715 | 3 | 2,712 |
| 275–300° F | 2,417 | 2,292 | 4 | 2,288 |
| 300–335° F | 3,010 | 449 | 1 | 448 |
| 335–EP | 1,370 | | | |
| | 27,381 | 6,532 | 550 | 5,982 |

Solvent 33,000 bbl./day triethylene glycol.
Temperature of extractor 220–370° F.
Pressure in extractor 50–150 p. s. i. a.
Temperature of flash 220–370° F.
Pressure of flash 0.9 p. s. i. a.

In certain cases it will be found that the solubility of the desired extract hydrocarbon in the solvent under the conditions of extraction, according to this invention, is quite high. In order to improve the selectivity in such a case, it is often desirable to dissolve in the solvent a small amount of water which decreases the solvent power of the solvent for low-boiling aromatics and improves the selectivity. Ordinarily, an amount of water up to about 10 weight percent based on the solvent is satisfactory for this purpose.

The foregoing example illustrates the application of the present invention to the production of a raffinate phase which is naphtha having a boiling range of approximately 225° to 335° F., and an extract phase which is an alkylbenzene concentrate having a boiling range of approximately 250° to 335° F.

Variation and modification are possible within the scope of the disclosure and claims of this invention, the essence of which is that a liquid-liquid solvent extraction process is provided, wherein the extraction step and the stripping step are operated at substantially isothermal conditions, a hydrocarbon feed being contacted with a selective solvent at an elevated temperature and under liquid-liquid extraction conditions, an extract phase being separated from a raffinate phase, said extract phase being stripped of dissolved hydrocarbon at a pressure lower than the extraction pressure, only sufficient heat being added during the stripping step to prevent a substantial change in the temperature, and the stripped solvent being returned to the extraction step at substantially the temperature of the stripping step. Suitable solvents comprise the polyalkylene glycols and alkyl ethers thereof.

In many cases, especially where the product extract is a cycloparaffin, additional purification of the extract hydrocarbon can be obtained by washing with strong sulfuric acid, e. g., equivalent to 98 to 105% H₂SO₄, to remove impurities such as olefins and aromatics.

I claim:

1. A process for the separation of organic materials of different chemical constitution by solvent extraction, which process comprises contacting a mixture of such materials with a solvent selective for one of said materials so as to extract said one of said materials, said contacting being conducted at elevated temperature under substantially isothermal conditions; passing the mixed solvent and extracted organic material without substantial change in temperature to a separation zone; and separating the solvent and extract in said separation zone by vaporization at substantially the temperature of the contacting step under reduced pressure and isothermal conditions.

2. A process for separating hydrocarbons of different chemical structure and solubilities which comprises effecting liquid-liquid contacting of a mixture of such hydrocarbons with a high-boiling thermally stable solvent at a temperature in the range of 200° to 400° F. so as to separate an extract phase and a raffinate phase; passing said extract phase at substantially the contacting temperature to a vaporizing zone; reducing the pressure in said zone while supplying heat thereto in sufficient amount to prevent substantial temperature change therein so as to vaporize extract hydrocarbon from liquid solvent; recovering vaporized extract hydrocarbon from said zone; and returning stripped solvent without substantial temperature change to the extraction step.

3. A process for separating hydrocarbons of different chemical structure and solubilities which comprises effecting liquid-liquid contacting of a mixture of such hydrocarbons with a high-boiling thermally stable solvent at a temperature in the range of 200° to 400° F. under substantially isothermal conditions so as to separate an extract phase and a raffinate phase; passing said extract phase at substantially the contacting temperature to a vaporizing zone; maintaining said vaporizing zone under reduced pressure so as to cause vaporization of extract hydrocarbon from solvent while supplying sufficient heat to maintain said zone substantially under isothermal conditions and substantially at aforesaid contacting temperature; and recovering vaporized extract hydrocarbon from said zone.

4. A process according to claim 2 wherein the solvent is selected from the group consisting of polyethylene glycols and alkyl ethers of polyethylene glycols.

5. A process according to claim 2 wherein the raffinate phase comprises isomeric heptanes, the extract hydrocarbon is cyclohexane, and the solvent is triethylene glycol.

6. A process according to claim 2 wherein the extract hydrocarbon comprises a xylene, the raffinate comprises a non-aromatic hydrocarbon, the temperature is in the range 200° to 350° F., and the solvent is triethylene glycol.

7. A process according to claim 2 wherein the extract hydrocarbon comprises cyclopentane, the raffinate is a paraffinic hydrocarbon, and the temperature is in the range 200° to 350° F.

8. A process according to claim 2 wherein the extract hydrocarbon is benzene and the raffinate hydrocarbon is a non-aromatic hydrocarbon.

9. A process according to claim 2 wherein the extract hydrocarbon is methylcyclohexane and the raffinate hydrocarbon is a paraffinic hydrocarbon.

10. A process according to claim 2 wherein the separated extract phase is maintained at a pressure not greater than 65 p. s. i. a.

11. A process according to claim 2 wherein the solvent has a boiling point not more than 450° F.

12. A process according to claim 2 wherein part of the recovered extract hydrocarbon is recycled to a lower part of the extraction zone.

13. A process according to claim 2 wherein the extract hydrocarbon is an aromatic hydrocarbon and a low-boiling paraffin hydrocarbon is passed into the lower part of the extraction zone.

14. A process according to claim 2 wherein the hydrocarbon feed is a benzene concentrate and an amount of water not greater than 10 weight percent is maintained in the solvent during the extraction step.

15. A process for producing a high purity cyclohexane from a cyclohexane concentrate containing paraffins, which process comprises countercurrently contacting said concentrate with triethylene glycol under liquid-liquid extraction conditions in an extraction zone at a temperature in the range 350° to 400° F., so as to separate an extract phase from a raffinate phase; subjecting said extract phase to subatmospheric pressure in a stripping zone while maintaining the temperature in said zone in the range 350° to 400° F.; recovering cyclohexane vaporized in said stripping zone; and returning stripped triethylene glycol without substantial change in temperature to said extraction zone.

16. A process according to claim 2 wherein said solvent is selected from the group consisting of polyalkylene glycols and alkyl ethers thereof.

17. A process according to claim 15 wherein said recovered cyclohexane is water washed to remove dissolved solvent, treated with sulfuric acid having a concentration in the range 98 to 105% to remove aromatic compounds and fractionated to remove other cyclic compounds to obtain a purified extract having a cyclohexane content of at least 99.5 volume percent.

18. A process according to claim 2 wherein the raffinate phase is a naphtha having a boiling range of approximately 225° to 335° F., the extract phase alkylbenzene concentrate boiling within the range 250° to 335° F., and the solvent is triethylene glycol.

19. A process according to claim 18 wherein the temperature of the liquid contacting is in the range 350° to 450° F., the pressure of said contacting is in the range 50 to 150 p. s. i. a., and said reduced pressure is in the range 0.9 to 15 p. s. i. a.

References Cited in the file of this patent

UNITED STATES PATENTS

| 2,396,302 | Cummings et al. | Mar. 12, 1946 |
| 2,407,820 | Durrum | Sept. 17, 1946 |
| 2,444,582 | Smith | July 6, 1948 |
| 2,481,843 | Holt et al., | Sept. 13, 1949 |
| 2,569,216 | Arundale | Sept. 25, 1951 |
| 2,572,583 | Antle | Oct. 23, 1951 |
| 2,711,433 | Poffenberger | June 21, 1955 |

OTHER REFERENCES

Smith et al.: Industrial and Engineering Chemistry, vol. 43, pages 766–770 (page 766 only needed), March 1951.